(12) United States Patent
Psaromiligkos et al.

(10) Patent No.: US 9,544,032 B2
(45) Date of Patent: Jan. 10, 2017

(54) SYSTEM AND METHOD FOR MULTIPLE-INPUT MULTIPLE-OUTPUT (MIMO) ORTHOGONAL FREQUENCY DIVISION MULTIPLEXING (OFDM) OFFSET QUADRATURE AMPLITUDE MODULATION (OQAM)

(71) Applicant: Huawei Technologies Canada Co., Ltd., Kanata (CA)

(72) Inventors: Ioannis Psaromiligkos, Westmount (CA); Ivan Tinjaca, Montreal (CA); Mohammad Javad Abdoli, Kanata (CA)

(73) Assignee: Huawei Technologies Canada Co., Ltd., Ontario (CA)

(*) Notice: Subject to any disclaimer, the term of this patent is extended or adjusted under 35 U.S.C. 154(b) by 0 days.

(21) Appl. No.: 14/549,205

(22) Filed: Nov. 20, 2014

(65) Prior Publication Data

US 2016/0149623 A1 May 26, 2016

(51) Int. Cl.
| | | |
|---|---|---|
| *H04B 7/04* | (2006.01) | |
| *H04B 7/06* | (2006.01) | |
| *H04L 25/03* | (2006.01) | |
| *H04L 27/36* | (2006.01) | |
| *H04B 1/12* | (2006.01) | |
| *H04L 27/26* | (2006.01) | |

(52) U.S. Cl.
CPC .............. *H04B 7/0456* (2013.01); *H04B 1/12* (2013.01); *H04L 27/2626* (2013.01); *H04L 27/2647* (2013.01); *H04L 27/2698* (2013.01)

(58) Field of Classification Search
CPC ..... H04B 1/12; H04B 7/0456; H04L 27/2626; H04L 27/2647; H04L 27/2698
See application file for complete search history.

(56) References Cited

U.S. PATENT DOCUMENTS

| 4,959,863 A * | 9/1990 | Azuma et al. ................ 704/272 |
| 8,542,763 B2 * | 9/2013 | Forenza et al. ............... 375/267 |
| 2009/0316810 A1 | 12/2009 | Lele et al. |
| 2011/0002408 A1 | 1/2011 | Javaudin |
| 2011/0096851 A1 * | 4/2011 | Clerckx et al. ............... 375/259 |

(Continued)

FOREIGN PATENT DOCUMENTS

| CN | 101795257 A | 8/2010 |
| WO | 2013171417 A1 | 11/2013 |

OTHER PUBLICATIONS

Vahlin, A. et al., "Optimal Finite Duration Pulses for OFDM," IEEE Transactions on Communications, vol. 44, No. 1, Jan. 1996, pp. 10-14.

(Continued)

*Primary Examiner* — David B. Lugo
(74) *Attorney, Agent, or Firm* — Slater Matsil, LLP

(57) ABSTRACT

In one embodiment, a method for transmitting data in a multiple-input multiple-output (MIMO) orthogonal frequency division multiplexing (OFDM)-offset quadrature amplitude modulation (OQAM) system includes selecting a precoding matrix in accordance with a projection of the precoding matrix on a precoding space and generating a precoded modulated pulse shape by applying the precoding matrix to a data vector and a pulse shape. The method also includes transmitting, by a first device to a second device, the precoded modulated pulse shape.

14 Claims, 6 Drawing Sheets

(56) References Cited

U.S. PATENT DOCUMENTS

| | | |
|---|---|---|
| 2011/0211628 A1* | 9/2011 | Hammarwall et al. ....... 375/224 |
| 2012/0099540 A1* | 4/2012 | Doppler et al. ............. 370/329 |
| 2013/0148488 A1 | 6/2013 | Gao et al. |
| 2013/0242769 A1* | 9/2013 | Hammarwall ........ H04L 5/0016 370/252 |
| 2015/0171950 A1* | 6/2015 | Phan Huy ............ H04B 7/0697 |

OTHER PUBLICATIONS

Zakaria, R. et al., "A Novel Filter-Bank Multicarrier Scheme to Mitigate the Intrinsic Interference: Application to MIMO Systems," IEEE Transactions on Wireless Communications, vol. 11, No. 3, Mar. 2012, pp. 1112-1123.

\* cited by examiner

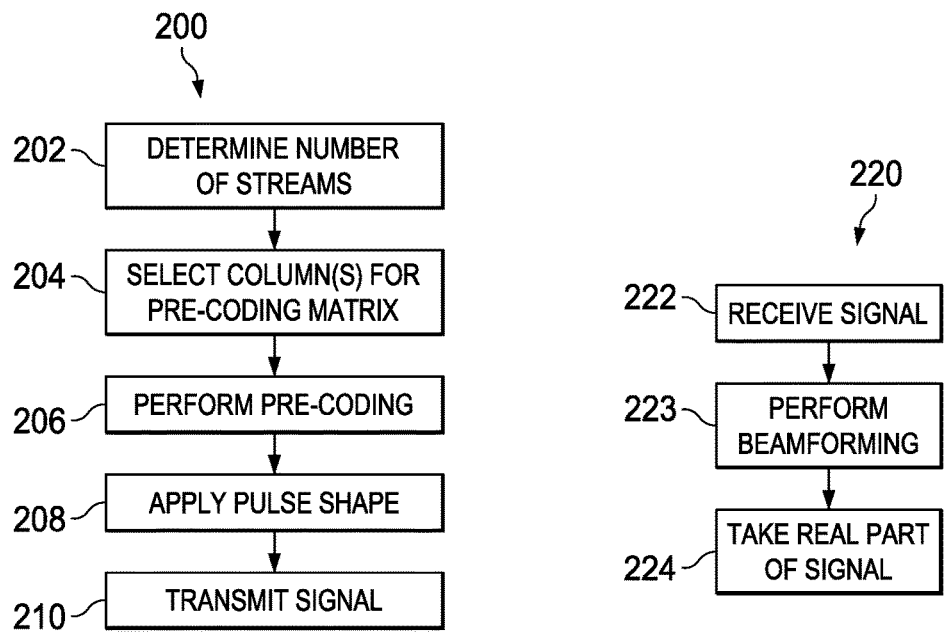
FIG. 6
FIG. 7
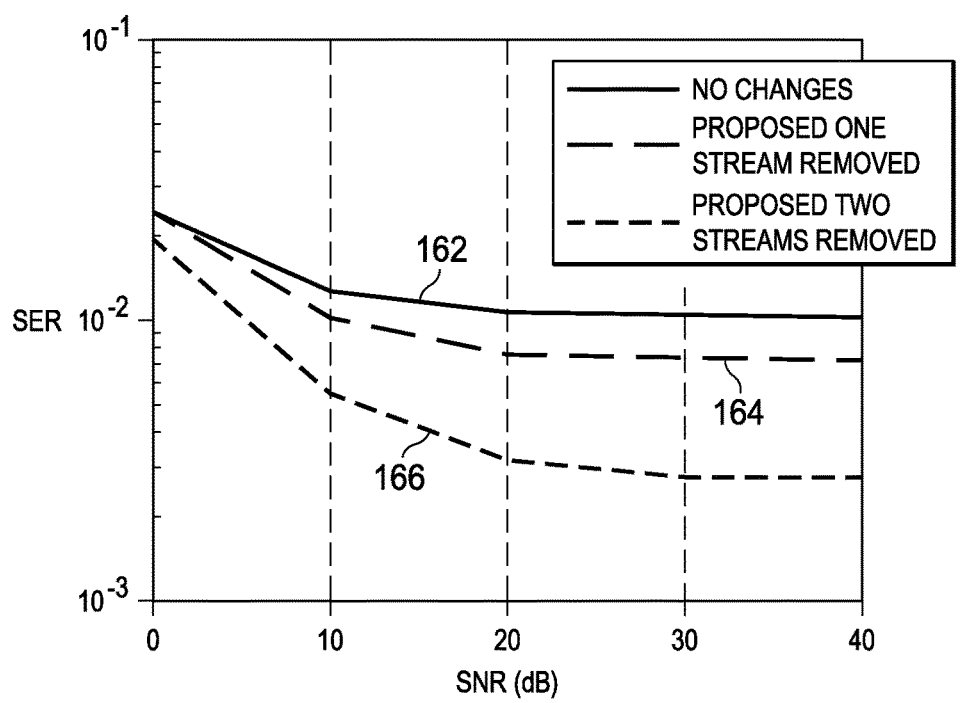
FIG. 8A

SYSTEM AND METHOD FOR MULTIPLE-INPUT MULTIPLE-OUTPUT (MIMO) ORTHOGONAL FREQUENCY DIVISION MULTIPLEXING (OFDM) OFFSET QUADRATURE AMPLITUDE MODULATION (OQAM)

TECHNICAL FIELD

The present invention relates to a system and method for communications, and, in particular, to a system and method for multiple-input multiple-output (MIMO) orthogonal frequency division multiplexing (OFDM)-offset quadrature amplitude modulation (OQAM).

BACKGROUND

Orthogonal frequency division multiplexing (OFDM) is a method of encoding digital data on multiple carrier frequencies. In one example, 600 subcarriers are used, which are modulated with data points. There are a large number of closely spaced orthogonal sub-carrier signals used to carry data on several streams. In OFDM, rectangular pulses are transmitted in time. Because the pulses are rectangular in time, inter-symbol interference (ISI) may be eliminated using a guard period between symbols. In OFDM, the subcarriers are orthogonal, eliminating inter-carrier interference (ICI).

OFDM-offset quadrature amplitude modulation (OQAM) is another multicarrier transmission method which uses different shaped pulses with multiple sub-carriers. Pulse shapes with good side lobe properties in the frequency domain and/or time domain may be chosen. Pulse shapes used may include root raised cosine (RRC) pulse, isotropic orthogonal transform algorithm (IOTA) pulse, sinc function pulses, Bellanger pulses, etc. OFDM-OQAM has good power spectral density (PSD) side lobe decay properties. The length of the pulse shape may be at least four symbol lengths to facilitate low ISI, ICI, and good frequency localization. This may lead to ISI and ICI, because the OFDM-OQAM symbols span more than one symbol time period. When one antenna is used in OFDM-OQAM, the pulses are real-orthogonal. Because the pulses are real-orthogonal, the ISI may be removed.

SUMMARY

An embodiment method for transmitting data in a multiple-input multiple-output (MIMO) orthogonal frequency division multiplexing (OFDM)-offset quadrature amplitude modulation (OQAM) system includes selecting a precoding matrix in accordance with a projection of the precoding matrix on a precoding space and generating a precoded modulated pulse shape by applying the precoding matrix to a data vector and a pulse shape. The method also includes transmitting, by a first device to a second device, the precoded modulated pulse shape.

An embodiment method for receiving data in a MIMO OFDM-OQAM system includes receiving, by a first device from a second device, a signal, where the signal is a precoded modulated channel modified receiver modulated signal, and where precoding of the signal maximizes a projection of a precoding matrix on a precoding space and performing beamforming. The method also includes removing interference from the signal including taking a real component of the signal in accordance with the beamforming.

An embodiment first wireless device includes a processor and a non-transitory computer readable storage medium storing programming for execution by the processor. The programming including instructions to select a precoding matrix in accordance with a projection of the precoding matrix on a precoding space and generate a precoded modulated pulse shape by applying the precoding matrix to a data vector and a pulse shape. The programming also includes instructions to transmit, to a second device, the precoded modulated pulse shape.

An embodiment first wireless device includes a processor and a non-transitory computer readable storage medium storing programming for execution by the processor. The programming including instructions to receive, from a second device, a signal, where the signal is a precoded modulated channel modified receiver modulated signal, and where precoding of the signal maximizes a projection of a precoding matrix on a precoding space and perform beamforming. The programming also includes instructions to remove interference from the signal including taking a real component of the signal in accordance with the beamforming.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 6 illustrates a flowchart of an embodiment method of transmitting with ODFM-OQAM MIMO;

FIG. 7 illustrates a flowchart of an embodiment method of receiving with OFDM-OQAM MIMO;

FIGS. 8A-B illustrate performance graphs for OFDM-OQAM MIMO edge points;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In multiple-input multiple-output (MIMO), multiple antennas are used at both the receiver and transmitter. MIMO increases data throughput and link range without adding bandwidth or increasing bandwidth by spreading the same total transmit power over the antennas to achieve an array gain, improving the spectral efficiency and/or a diversity gain which improves link reliability by reducing fading. In MIMO OFDM-OQAM, using different complex pre-coders on neighboring time-frequency locations may lead to ISI and/or ICI.

In an embodiment, transmission rank in multiple-input multiple-output (MIMO) orthogonal frequency division multiplexing (OFDM)-offset quadrature amplitude modulation (OQAM) is reduced to reduce inter-carrier interference (ICI) and inter-symbol interference (ISI). A subset of the pre-coder columns is selected for transmission at each time-frequency point at the border of a block. A vector projection approach is used to select the columns.

Figure 1:
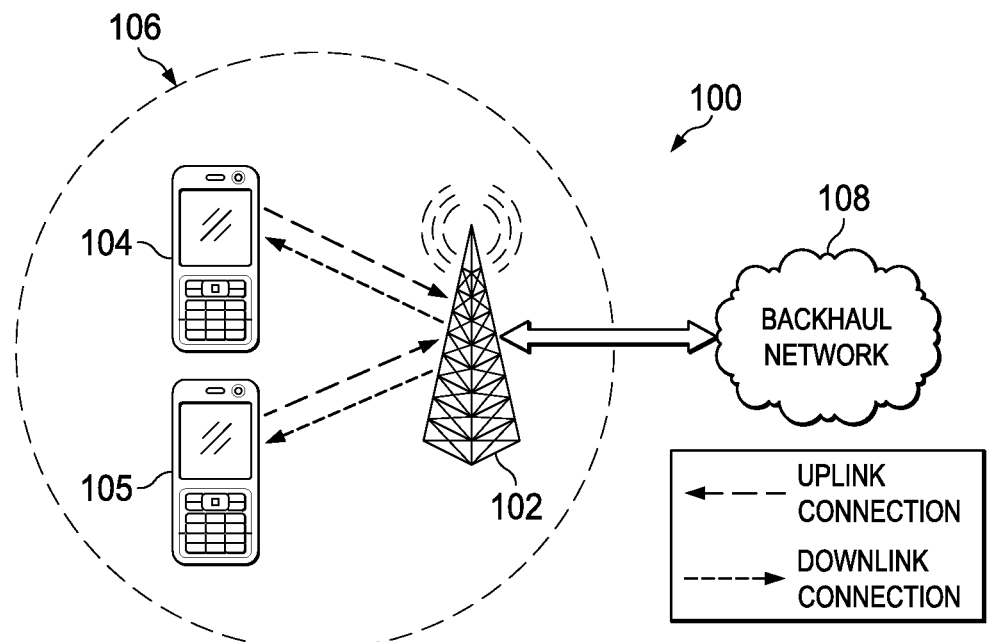
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by, inter alia, establishing uplink (dashed line) and/or downlink (dotted line) connections with UE 104 and UE 105, such as a base station, an enhanced base station (eNB), an access point, a picocell, a femtocell, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, etc. MIMO OFDM-OQAM communications may be performed over a wireless communications network, such as network 100.

In MIMO, there are multiple transmit and receive antennas. Multiple data streams are emitted from the transmit antennas with independent and appropriate weightings so the link is maximized at the receiver output. Precoding is a generalization of beamforming which supports MIMO.

In OFDM-OQAM MIMO transmission of L streams, L transmission antennas transmit vectors of data points with L real values. A data point, which is a vector of real values, is given by:

$$d_{m,n} = [d_{m,n}^0, d_{m,n}^1, \ldots, d_{m,n}^{L-1}]^T.$$

where m is the subcarrier index and n is the symbol or time index. The data point is pre-coded to produce pre-coded vector:

$$s_{m,n} = U_{m,n} d_{m,n},$$

where $U_{m,n}$ is a precoding matrix, and $s_{m,n}$ is a complex vector. The pre-coded vector is modulated with pulse shape $g_{m,n}(t)$ to produce pre-coded modulated pulse shape $s_{m,n}(t)$, which is transmitted. The transmitted pre-coded modulated pulse shape is given by:

$$s_{m,n}(t) = s_{m,n} g_{m,n}(t).$$

The noiseless version of the signal received by an OFDM-OQAM MIMO receiver is:

$$r(t) = \sum_{(\mu,v)} H_{\mu,v} s_{\mu,v}(t),$$

where $H_{\mu,v}$ is the channel matrix, $\mu$ is the subcarrier index, and $v$ is the time index. The output of the receiver is given by:

$$r_{m,n} = \int_{-\infty}^{+\infty} r(t) g_{m,n}(t)^* dt,$$

where $g_{m,n}(t)$ is the response of the receiver. The received signal is given by:

$$r_{m,n} = \alpha_{m,n,m,n} H_{m,n} U_{m,n} d_{m,n} + \sum_{(\mu,v) \neq (m,n)} \alpha_{m,n,\mu,v} H_{\mu,v} U_{\mu,v} d_{\mu,v}$$

where $$\alpha_{m,n,\mu,v} = \int_{-\infty}^{+\infty} g_{\mu,v}(t) g_{m,n}(t)^* dt,$$

denotes the correlation between the pulse shapes corresponding to lattice points (m, n) and ($\mu$,v). Because the magnitude of $\alpha_{m,n,\mu,v}$ is small for $|\mu-m|>1$ or $|v-n|>1$, the received signal can be well approximated by:

$$r_{m,n} = \alpha_{m,n,m,n} H_{m,n} U_{m,n} d_{m,n} + \sum_{(\mu,v) \in \Omega_{m,n}} \alpha_{m,n,\mu,v} H_{\mu,v} U_{\mu,v} d_{\mu,v}$$

where $\Omega_{m,n}$ is the following neighborhood of the point (m, n):

$$\Omega_{m,n} \{(\mu,v); |\mu-m| \leq 1 \text{ and } |v-n| \leq 1 \text{ and } (\mu,v) \neq (m,n)\}.$$

The first portion of this equation represents the desired part of the received signal, while the second portion of this equation represents the self-interference.

Figure 2:
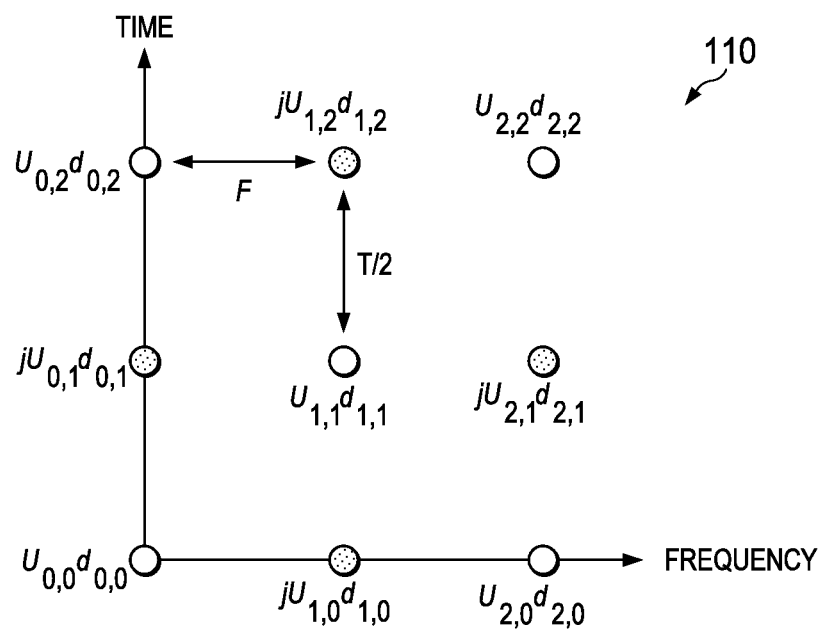
FIG. 2 illustrates an embodiment orthogonal frequency division multiplexing (OFDM)-offset quadrature amplitude modulation (OQAM) structure.

FIG. 2 illustrates structure 110, an OFDM-OQAM time-frequency lattice structure. Every other point is either purely real or purely imaginary. This facilitates that the OFDM-OQAM signal structure is interference-free with one antenna.

In OFDM-OQAM MIMO, the time-frequency lattice may be partitioned into blocks. Each block may be assigned a precoding matrix, which may be applied to the time-frequency points belonging to that block. Because the same precoding matrix is used for the points within the same block, intra-block interference is not problematic, because it is purely imaginary, and may be canceled out. However, inter-block interference, where a different complex precoding matrix is used, may cause problems. The received signal after receiver beamforming is given by:

$$V_{m,n}^H r_{m,n} = V_{m,n}^H H_{m,n} U_{m,n} d_{m,n} + V_{m,n}^H \left( H_{m,n} U_{m,n} \sum_{(\mu,v) \in \Omega_{m,n} \cap B_{m,n}} \alpha_{m,n,\mu,v} d_{\mu,v} \right) + V_{m,n}^H \sum_{(\mu,v) \in \Omega_{m,n} - B_{m,n}} \alpha_{m,n,\mu,v} H_{\mu,v} U_{\mu,v} d_{\mu,v},$$

where $B_{m,n}$ denotes the set of points in the same block as (m, n).

The desired signal to be extracted is given by:

$$V_{m,n}^H H_{m,n} U_{m,n} d_{m,n},$$

which is purely real. The intra-block interference from points in the same block is given by:

$$V_{m,n}^H \left( H_{m,n} U_{m,n} \sum_{(\mu,\nu) \in \Omega_{m,n} \cap B_{m,n}} \alpha_{m,n,\mu,\nu} d_{\mu,\nu} \right).$$

The intra-block interference is benign interference, because it is purely imaginary. On the other hand, the inter-block interference from adjacent blocks is given by:

$$V_{m,n}^H \sum_{(\mu,\nu) \in \Omega_{m,n} - B_{m,n}} \alpha_{m,n,\mu,\nu} H_{\mu,\nu} U_{\mu,\nu} d_{\mu,\nu},$$

The inter-block interference is complex, and may be problematic. The different blocks use different complex precoding matrices. To extract data, the real part of the signal is taken, for example:

$$\hat{d}_{m,n} = \Re\{V_{m,n}^H r_{m,n}\}$$

Taking the real part removes intra-block interference but may not remove inter-block interference.

Figure 3:
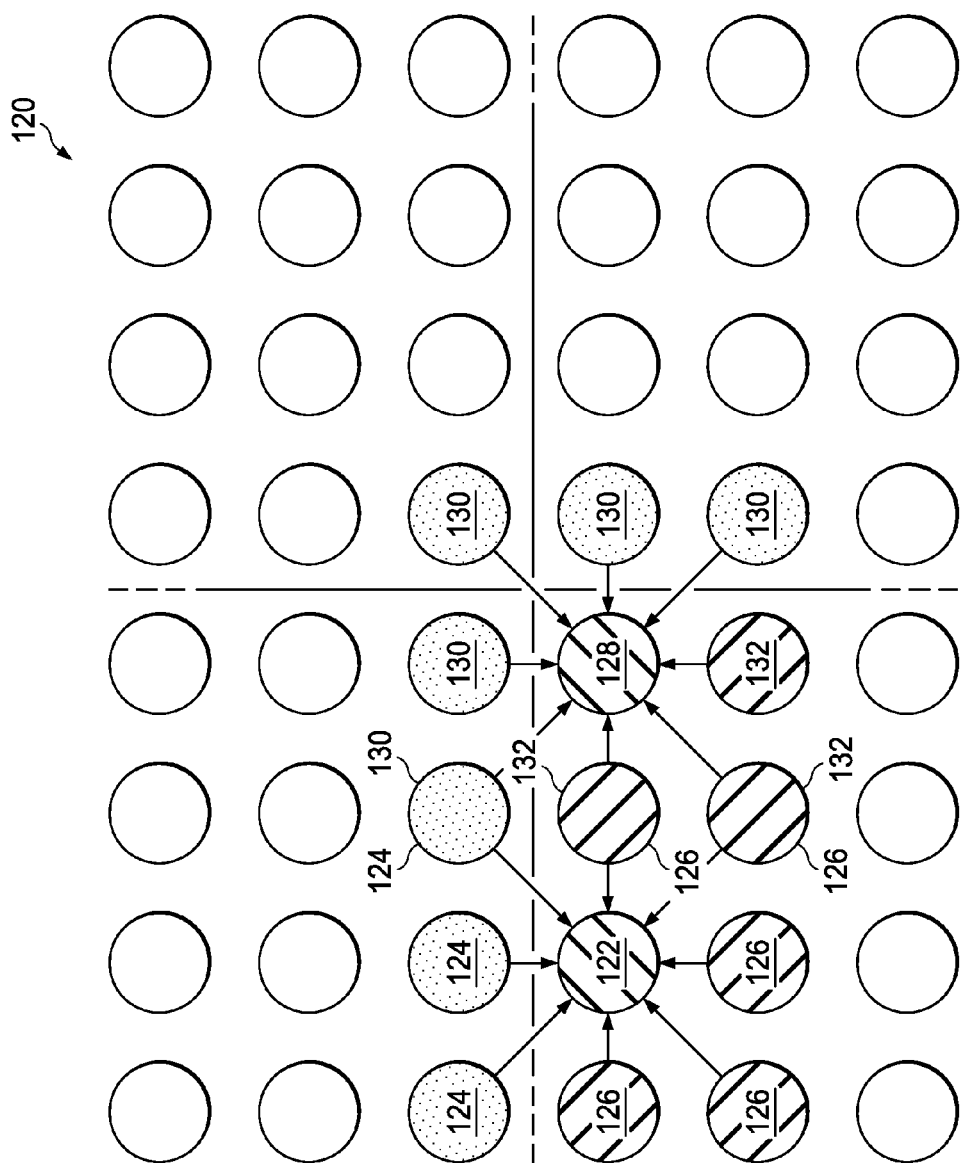
FIG. 3 illustrates an OFDM-OQAM structure with multiple-input multiple-output (MIMO) points.

Neighboring points in different blocks may lead to interference. FIG. 3 illustrates MIMO points 120. Point 122, an edge point, has neighboring points 126 in the same block and neighboring points 124 in a different block. Also, point 128, a corner point, has neighboring points 132 in the same block and neighboring points 130 in different blocks. In one example, the eight points bordering a point are considered the neighboring points. Neighboring points in different blocks may lead to interference. Points which are not neighboring points may not be problematic, because the pulse shape is localized, and is small outside of neighboring points.

In one example $T_{m,n}$ is defined as:

$$T_{m,n} = \{U_{m,n} x : x \in \mathbb{R}^L\},$$

where $U_{m,n}$ is the precoding matrix, and x is any real vector with length L. The precoding space of the point (m,n) is defined as $T_{m,n}$. The set of points causing interference is given by:

$$\Omega'_{m,n} = \Omega_{m,n} - B_{m,n},$$

where $\Omega_{m,n}$ is the set of eight immediate neighboring points, and $B_{m,n}$ are the neighboring points in the same block. Interference from outside the neighborhood is not considered. When:

$$U_{m',n'} d_{m',n'} \in T_{m,n}$$

for a point:

$$(m',n') \in \Omega'_{m,n},$$

the inter-block interference from (m', n') may be cancelled by the receiver. In this case, it may be treated as intra-block interference and canceled out at the receiver by taking the real part, even though it uses a different complex precoding.

In an embodiment, there is a reduction in the number of streams used. For example, K streams are transmitted, instead of L, for L≥K>1. The K streams are selected so that their spatial directions, described by the corresponding columns of the precoding matrix, lie in $T_{m,n}$ to the extent possible, to increase the amount of interference which may be canceled out by performing a real operation. Thus, spectral efficiency is sacrificed to reduce interference.

Figure 4:
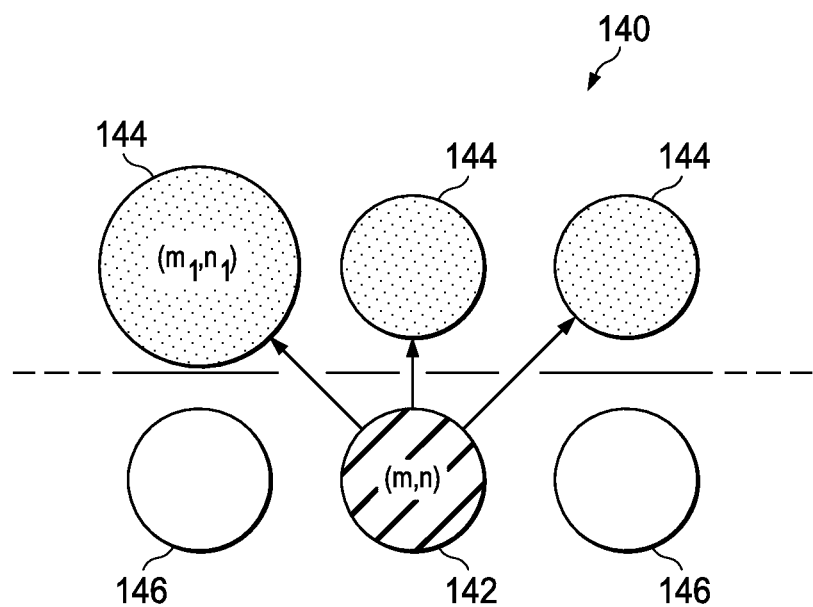
FIG. 4 illustrates an OFDM-OQAM MIMO edge point.

FIG. 4 illustrates points 140, with point 142, a non-corner point. Point 142 has neighbors 146 in the same block and neighbors 144 in another block. In one example, where K=1, for a non-corner point:

$$U_{m,n} = [u_{m,n}^1, u_{m,n}^2, \ldots, u_{m,n}^L].$$

With L streams, there are L columns. The projection of onto $u_{m,n}^i$ is $T_{m',n'}$ is $U_{m',n'} x^i$ where the real vector $x^i$ is given by:

$$x^i = \arg\min_{x \in \mathbb{R}^L} \|u_{m,n}^i - U_{m',n'} x\|^2.$$

When:

$$\overline{X} = \begin{pmatrix} \Re\{X\} \\ \Im\{X\} \end{pmatrix}$$

then:

$$x^i = \overline{U}_{m',n'}^\dagger \overline{u}_{m,n}^i$$

where $\overline{U}_{m,n}^\dagger$ is the Moore-Penrose pseudo-inverse of $\overline{U}_{m,n}$. A pseudo-inverse is a generalization of the inverse matrix. To minimize the mutual interferences between the adjacent blocks, the values of i and j are selective to maximize:

$$\|u_{m',n'}^i (\overline{u}_{m',n'}^j)^\dagger \overline{u}_{m,n}^i\|^2 + \|u_{m,n}^i (\overline{u}_{m,n}^i)^\dagger \overline{u}_{m',n'}^j\|^2.$$

The columns are chosen to maximize the projections on $T_{m',n'}$ and $T_{m,n}$ m which minimizes interference.

In a more general example, transmission of K streams is considered for non-corner points. In this example $i_1, i_2, \ldots, i_K$ and $j_1, j_2, \ldots, j_K$ are selected to maximize:

$$\sum_{l=1}^K \|U_{m',n'}^{j_1,\ldots,j_K} (\overline{U}_{m',n'}^{j_1,\ldots,j_K})^\dagger \overline{u}_{m,n}^{i_l}\|^2 + \sum_{l=1}^K \|U_{m,n}^{j_1,\ldots,j_K} (\overline{U}_{m,n}^{j_1,\ldots,j_K})^\dagger \overline{u}_{m',n'}^{j_l}\|^2,$$

where $U_{m,n}^{j_1,\ldots,j_K}$ denotes a matrix containing columns $j_1, j_2, \ldots, j_K$ of the matrix $U_{m,n}$. This minimizes interference.

Figure 5:
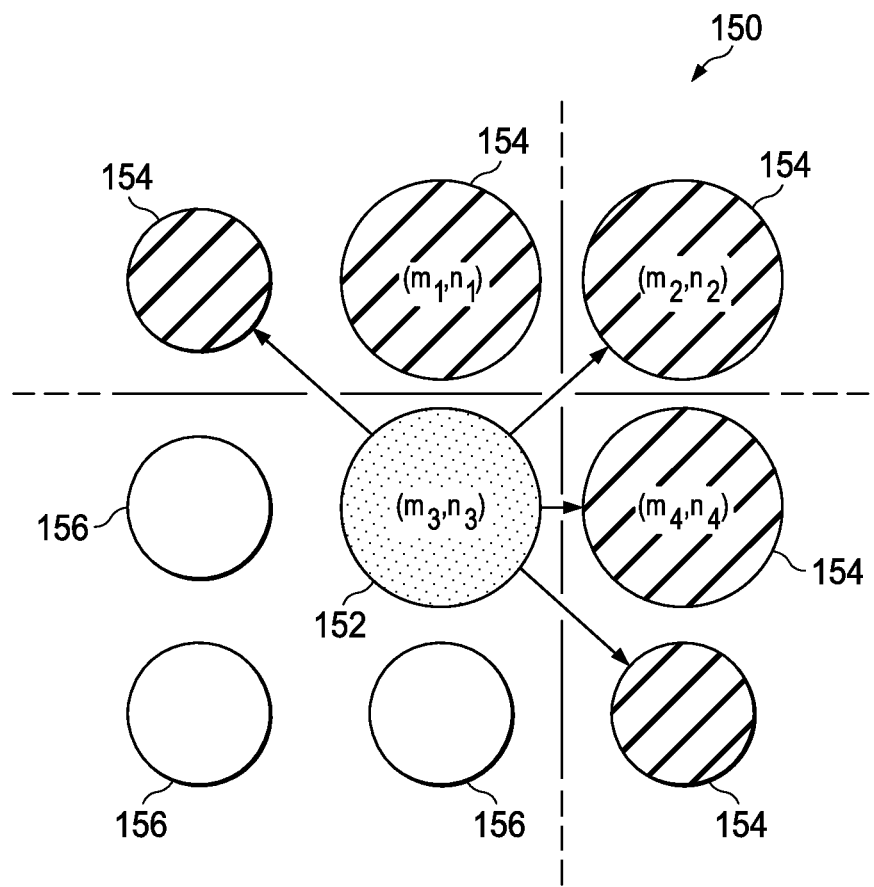
FIG. 5 illustrates an OFDM-OQAM MIMO corner point.

In another example, with a general K with a corner point is illustrated by points 150 in FIG. 5. Point 152, a corner point, has neighboring points 156 in the same block and neighboring points 154 in different blocks. The values $i_1, i_2, \ldots, i_K, j_1, j_2, \ldots j_K, p_1, p_2, \ldots, p_K$, and $q_1, q_2, \ldots, q_K$ are selected to maximize:

$$\sum_{l=1}^K (\|U_{m_2,n_2}^{j_1,\ldots,j_K} (\overline{U}_{m_2,n_2}^{j_1,\ldots,j_K})^\dagger \overline{u}_{m_1,n_1}^{i_l}\|^2 + \|U_{m_3,n_3}^{p_1,\ldots,p_K} (\overline{U}_{m_3,n_3}^{p_1,\ldots,p_K})^\dagger \overline{u}_{m_1,n_1}^{i_l}\|^2 +$$

$$\|U_{m_4,n_4}^{q_1,\ldots,q_K} (\overline{U}_{m_2,n_2}^{q_1,\ldots,q_K})^\dagger \overline{u}_{m_1,n_1}^{i_l}\|^2) + \sum_{l=1}^K (\|U_{m_1,n_1}^{i_1,\ldots,i_K} (\overline{U}_{m_1,n_1}^{i_1,\ldots,i_K})^\dagger \overline{u}_{m_2,n_2}^{j_l}\|^2 +$$

$$\|U_{m_3,n_3}^{p_1,\ldots,p_K} (\overline{U}_{m_3,n_3}^{p_1,\ldots,p_K})^\dagger \overline{u}_{m_2,n_2}^{j_l}\|^2 + \|U_{m_4,n_4}^{q_1,\ldots,q_K} (\overline{U}_{m_4,n_4}^{q_1,\ldots,q_K})^\dagger \overline{u}_{m_2,n_2}^{j_l}\|^2) +$$

$$\sum_{l=1}^K (\|U_{m_1,n_1}^{i_1,\ldots,i_K} (\overline{U}_{m_1,n_1}^{i_1,\ldots,i_K})^\dagger \overline{u}_{m_3,n_3}^{p_l}\|^2 + \|U_{m_2,n_2}^{j_1,\ldots,j_K} (\overline{U}_{m_2,n_2}^{j_1,\ldots,j_K})^\dagger \overline{u}_{m_3,n_3}^{p_l}\|^2 +$$

$$\|U_{m_4,\underline{n_4}}^{q1,\ldots,qK}(\overline{U}_{m_4,\underline{n_4}}^{q1,\ldots,qK})^\dagger$$
$$\overline{u}_{m_1,n_3}^{pl})\|^2) + \Sigma_{l=1}^K(\|U_{m_1,n_1}^{i1,\ldots,iK}$$
$$(\overline{U}_{m_1,n_1}^{i1,\ldots,iK})^\dagger \overline{u}_{m_4,n_4}^{ql})\|^2 +$$

$$\|U_{m_2,n_2}^{j1,\ldots,jK}(\overline{U}_{m_2,n_2}^{j1,\ldots,jK})^\dagger \overline{u}_{m_4,n_4}^{ql})\|^2 +$$
$$\|U_{m_3,n_3}^{p1,\ldots,pK}(\overline{U}_{m_3,n_3}^{p1,\ldots,pK})^\dagger \overline{u}_{m_4,n_4}^{ql})\|^2).$$

Minimizing this function reduces interference by projecting it towards the precoding space, so it can be canceled out.

FIG. 6 illustrates flowchart 200 for a method of transmitting data using MIMO OFDM-OQAM. Initially, in step 202, the number of data streams to be transmitted is determined. There is a tradeoff between the number of streams and interference. For example, the number of streams may be selected to have as many streams as practical while maintaining an acceptable level of interference.

After the number of streams is determined, the columns of the precoding matrix which correspond to the selected streams are selected in step 204. The columns are selected to be maximally projected onto the precoding space $T_{m,n}$. The interference from projected portions of the pre-coder matrix may be removed by taking the real component of the received portion. When K=1 for a non-corner point, the precoding matrix may be selected to maximize:

$$\|u_{m',n'}{}^j(\overline{u}_{m',n'}{}^j)^\dagger \overline{u}_{m,n}{}^i\|^2 + \|u_{m,n}{}^u(\overline{u}_{m,n}{}^i)^\dagger \overline{u}_{m',n'}{}^j\|^2.$$

For a general K with a non-corner point, the precoding matrix may be selected to maximize:

$$\sum_{l=1}^{K}\|U_{m',n'}^{j1,\ldots,jK}(\overline{U}_{m',n'}^{j1,\ldots,jK})^\dagger \overline{u}_{m,n}^{il}\|^2 + \sum_{l=1}^{K}\|U_{m,n}^{i1,\ldots,iK}(\overline{U}_{m,n}^{i1,\ldots,iK})^\dagger \overline{u}_{m',n'}^{jl}\|^2.$$

Also, for a general K with a corner point, the precoding matrix may be selected to maximize:

$$\Sigma_{l=1}^K(\|U_{m_2,n_2}^{j1,\ldots,jK}(\overline{U}_{m_2,n_2}^{j1,\ldots,jK})^\dagger$$
$$\overline{u}_{m_1,n_1}^{il})\|^2 + \|U_{m_3,n_3}^{p1,\ldots,pK}(\overline{U}_{m_3,n_3}^{p1,\ldots,pK})^\dagger$$
$$\overline{u}_{m_1,n_1}^{il})\|^2 +$$

$$\|U_{m_4,\underline{n_4}}^{q1,\ldots,qK}(\overline{U}_{m_2,n_2}^{q1,\ldots,qK})^\dagger$$
$$\overline{u}_{m_1,n_1}^{il})\|^2) + \Sigma_{l=1}^K(\|U_{m_1,n_1}^{i1,\ldots,iK}(\overline{U}_{m_1,n_1}^{j1,\ldots,iK})^\dagger \overline{u}_{m_2,n_2}^{jl})\|^2 +$$

$$\|U_{m_3,\underline{n_3}}^{p1,\ldots,pK}(\overline{U}_{m_3,n_3}^{p1,\ldots,pK})^\dagger$$
$$\overline{u}_{m_2,n_2}^{jl})\|^2 + \|U_{m_4,n_4}^{q1,\ldots,qK}(\overline{U}_{m_4,n_4}^{q1,\ldots,qK})^\dagger \overline{u}_{m_2,n_2}^{jl})\|^2) +$$

$$\Sigma_{l=1}^K(\|U_{m_1,n_1}^{i1,\ldots,iK}(\overline{U}_{m_1,n_1}^{i1,\ldots,iK})^\dagger$$
$$\overline{u}_{m_3,n_3}^{pl})\|^2 + \|U_{m_2,n_2}^{j1,\ldots,jK}(\overline{U}_{m_2,n_2}^{j1,\ldots,jK})^\dagger \overline{u}_{m_3,n_3}^{pl})\|^2 +$$

$$\|U_{m_4,\underline{n_4}}^{q1,\ldots,qK}(\overline{U}_{m_4,n_4}^{q1,\ldots,qK})^\dagger$$
$$\overline{u}_{m_1,n_3}^{pl})\|^2) + \Sigma_{l=1}^K(\|U_{m_1,n_1}^{i1,\ldots,iK}(\overline{U}_{m_1,n_1}^{i1,\ldots,iK})^\dagger \overline{u}_{m_4,n_4}^{ql})\|^2 +$$

$$\|U_{m_2,n_2}^{j1,\ldots,jK}(\overline{U}_{m_2,n_2}^{j1,\ldots,jK})^\dagger \overline{u}_{m_4,n_4}^{ql})\|^2 + \|U_{m_3,n_3}^{p1,\ldots,pK}(\overline{U}_{m_3,n_3}^{p1,\ldots,pK})^\dagger \overline{u}_{m_4,n_4}^{ql})\|^2).$$

After the precoding matrix has been selected, the transmitter applies the precoding matrix to a data vector in step 206. The data vector is purely real. When the precoding matrix is applied to the data vector, it produces a complex pre-coded vector.

Next, in step 208, the pulse shape is applied to the pre-coded vector to produce a modulated pulse shape. The pulse shape may be selected to have good time and/or frequency characteristics. Pulse shapes used may include root raised cosine (RRC) pulse, isotropic orthogonal transform algorithm (IOTA) pulse, sinc function pulses, etc. Pulse shapes with good side lobe characteristics in the frequency domain may be chosen.

Finally, in step 210, the modulated pulse shape is transmitted. In one example, the modulated pulse shape is transmitted from a communications controller to a UE. In another example, the modulated pulse shape is transmitted from a UE to a communications controller.

FIG. 7 illustrates flowchart 220 for a method of receiving a MIMO OFDM-OQAM signal. Initially, in step 222, a receiver receives a signal. A channel matrix has been applied to the transmitted signal to yield the received signal. Also, the received signal is integrated with the receiver response over time.

Then, in step 223, beamforming is performed. After performing the beamforming, the received signal contains the desired signal, which is purely real, interference which may be canceled out, which is purely imaginary, and interference which cannot be canceled out, which is complex.

Next, in step 224, the real part of the received signal is taken. This removes the portion of the interference which is purely imaginary, while leaving the real portion of the interference.

In one example, a simulation is performed in an OFDM-OQAM system with MIMO. The number of transmit antennas is 4 and the number of receive antennas is 5. The modulation scheme used is 16 quadrature amplitude modulation (QAM), with a complex constellation. The channel is modeled using Rayleigh fading. A Bellanger filter is used to obtain the pulse shape $g_{mn}(t)$. The channel matrix is given by:

$$H_{m,n} = L\Sigma R^H,$$

where L and R are matrices containing the left and right singular vectors of $H_{m,n}$ and $\Sigma$ is the diagonal matrix containing the singular values. The precoding matrix is given by:

$$U_{m,n} = R.$$

Also, the beamforming matrix is given by:

$$V_{m,n} = L(\Sigma^*)^\dagger.$$

The beamformer cancels the effects of the channel and the precoding matrix. That is:

$$V_{m,n}^H H U_{m,n} = I.$$

Figure 8B:
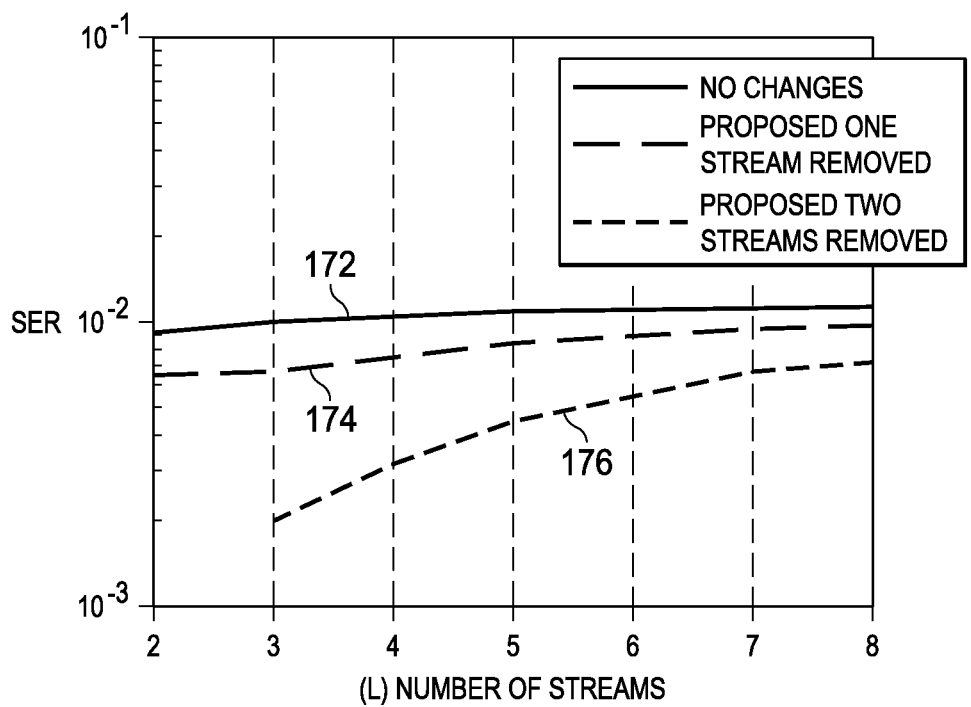

FIGS. 8A-B illustrate simulation results for edge points. FIG. 8A shows a graph of symbol error rate (SER) versus signal to noise ratio (SNR). Curve 162 shows the results with four streams, curve 164 shows the results with three streams, and curve 166 shows the results with two streams. Reducing the number of streams reduces the SER. Also, the SER goes down as the SNR increases. FIG. 8B shows a graph of SER verses the number of streams for edge points. Curve 172 shows the use of L streams, curve 174 shows L-1 streams, and curve 176 shows L-2 streams. Reducing the number of streams reduces the SER significantly. Reducing the number of streams has a greater effect when fewer streams are used.

Figure 9A:
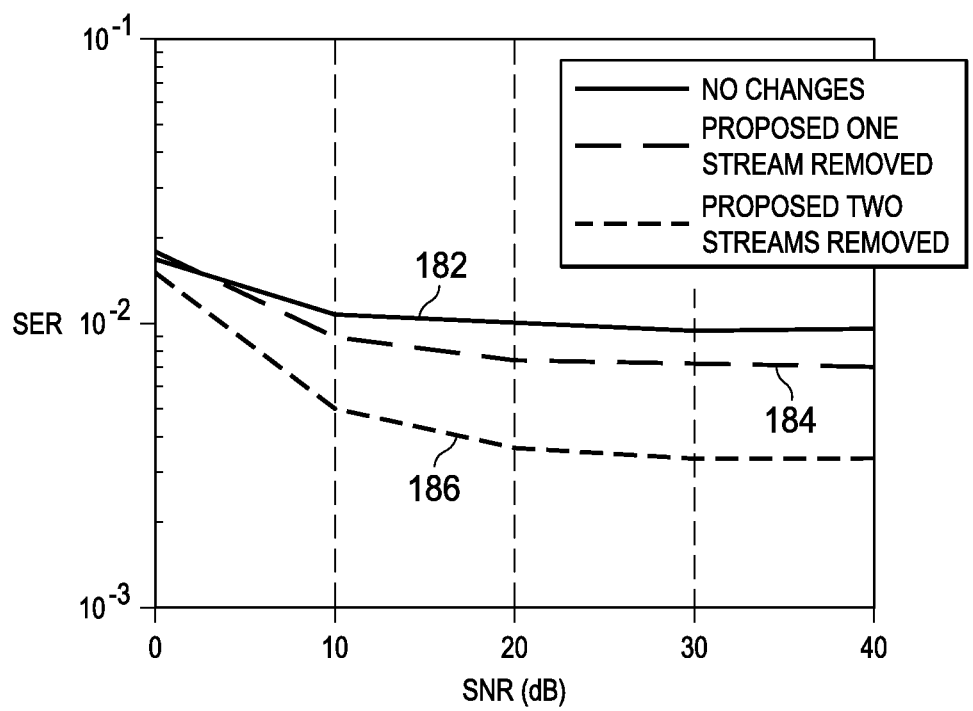
FIGS. 9A-B illustrate performance graphs for OFDM-OQAM MIMO corner points.
Figure 9B:
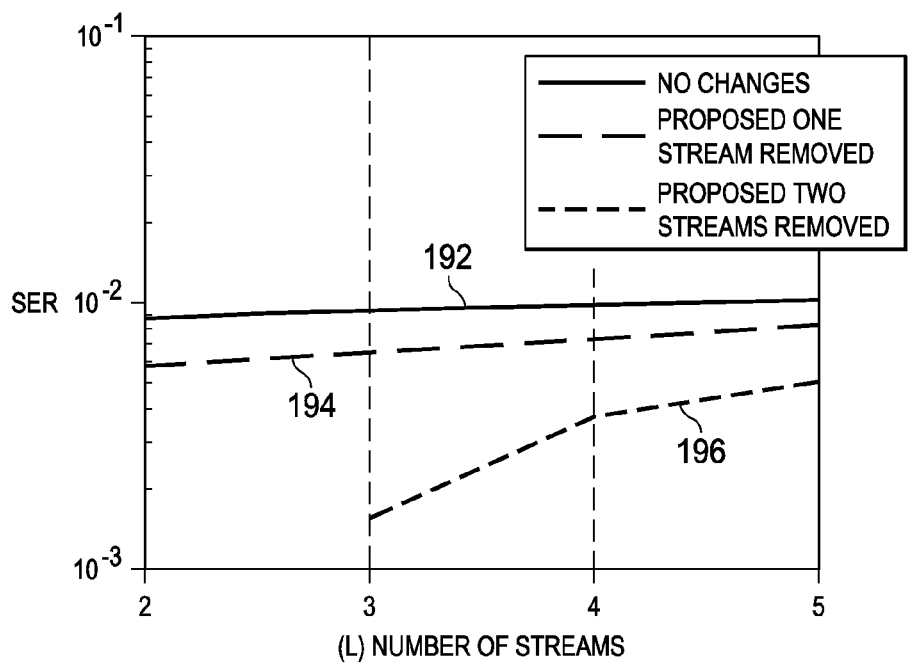

FIGS. 9A-B illustrate simulation results for corner points. FIG. 9A shows a graph of SER versus SNR. Curve 182 shows four streams, curve 184 shows three streams, and curve 186 shows two streams. Performance improves as SNR increases. Also, the performance is better with fewer streams. FIG. 9B shows a graph of SER versus number of streams for corner points. Curve 192 shows L streams, curve 194 shows L-1 streams, and curve 196 shows L-2 streams. The performance is better with a bigger reduction in streams. The interference level for corner points is a little worse than for edge points, but not much worse.

Figure 10:
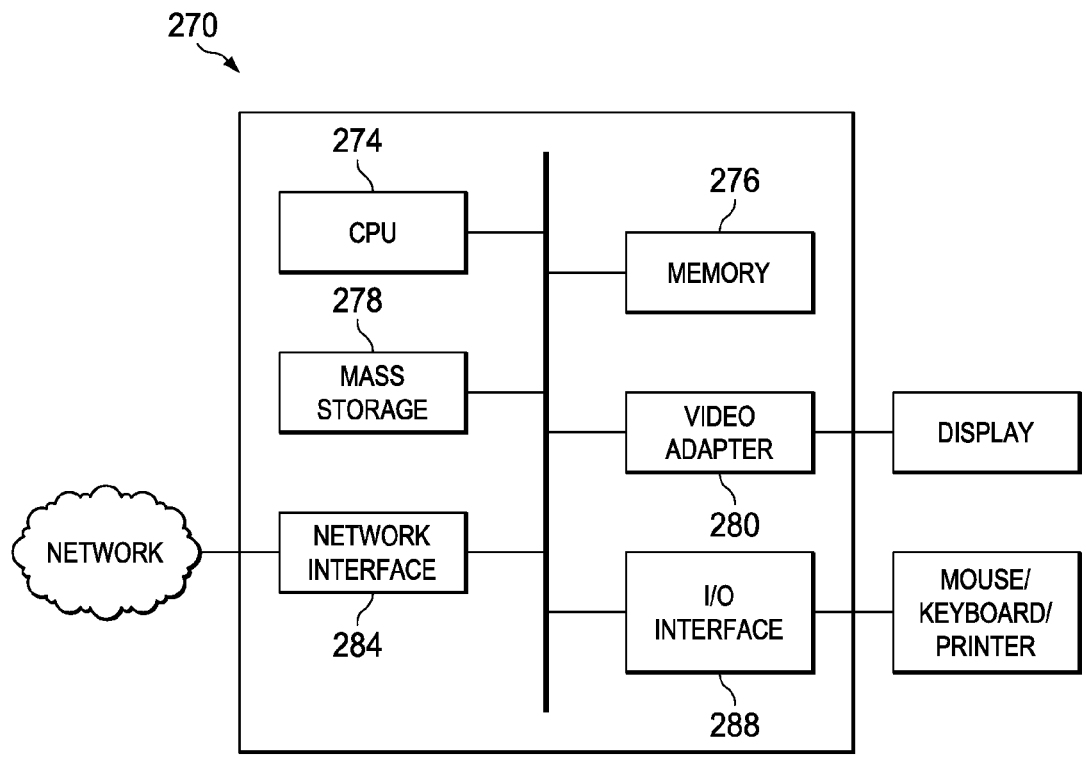
FIG. 10 illustrates a block diagram of an embodiment general-purpose computer system.

FIG. 10 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for transmitting data in a multiple-input multiple-output (MIMO) orthogonal frequency division multiplexing (OFDM)-offset quadrature amplitude modulation (OQAM) system, the method comprising:
   partitioning a time-frequency lattice into blocks;
   assigning a plurality of pre-coding matrices to the blocks such that a pre-coding matrix is assigned to a block;
   selecting a subset of columns for each pre-coding matrix to maximize a projection of each pre-coding matrix on a pre-coding space such that an interference between a first point of a first block and a second point of a second block is cancelled when the first point and the second point are neighboring points and the first block and the second block are different;
   generating a pre-coded modulated pulse shape by applying the pre-coding matrix to a data vector and a pulse shape; and
   transmitting, by a first device to a second device, the pre-coded modulated pulse shape.

2. The method of claim 1, wherein generating the pre-coded modulated pulse shape comprises:
   applying the pre-coding matrix to the data vector to produce a pre-coded vector; and
   applying the pre-coded vector to the pulse shape to produce the pre-coded modulated pulse shape.

3. The method of claim 1, further comprising determining a number of streams, wherein a number of columns of the subset of columns of the pre-coding matrix is equal to the number of streams.

4. The method of claim 1, further comprising selecting the pulse shape, wherein selecting the pulse shape comprises selecting a root raised cosine (RRC) pulse, an isotropic orthogonal transform algorithm pulse or a sinc function pulse.

5. The method of claim 1, further comprising selecting the pulse, wherein selecting the pulse shape comprises using a Bellanger filter.

6. The method of claim 1, wherein selecting the pre-coding matrix comprises at least one of the following steps:
   selecting the pre-coding matrix for an edge point of the block;
   selecting the pre-coding matrix for a corner point of the block; and
   selecting the pre-coding matrix in accordance with points adjacent to the edge point or the corner point in the block.

7. The method of claim 1, wherein the first device is a communications controller and the second device is a user equipment (UE).

8. The method of claim 1, wherein the first device is a UE and the second device is a communications controller.

9. A first wireless device comprising:
a processor; and
a non-transitory computer readable storage medium storing programming for execution by the processor, the programming including instructions to:
partition a time-frequency lattice into blocks;
assign a plurality of pre-coding matrices to the blocks such that a pre-coding matrix is assigned to a block;
select a subset of columns for each pre-coding matrix to maximize a projection of each pre-coding matrix on a pre-coding space such that an interference between a first point of a first block and a second point of a second block is cancelled when the first point and the second point are neighboring points and the first block and the second block are different;
generate a pre-coded modulated pulse shape by applying the pre-coding matrix to a data vector and a pulse shape; and
transmit, to a second device, the pre-coded modulated pulse shape.

10. The first wireless device of claim 9, wherein the instructions to generate the pre-coded modulated pulse shape comprise instructions to:
apply the pre-coding matrix to the data vector to produce a pre-coded vector; and
apply a pulse shape to the pre-coded vector to produce the pre-coded modulated pulse shape.

11. The first wireless device of claim 9, wherein the programming further comprises instructions to determine a number of streams, wherein a number of columns of the subset of columns of the pre-coding matrix is equal to the number of streams.

12. The first wireless device of claim 9, wherein the programming further comprises instructions to select the pulse shape, wherein the instruction to select the pulse shape comprises the instruction to select a root raised cosine (RRC) pulse, an isotropic orthogonal transform algorithm pulse or a sinc function pulse.

13. The first wireless device of claim 9, wherein the programming further comprises instructions to select the pulse shape, wherein the instructions to select the pulse shape comprise instructions to use a Bellanger filter.

14. The first wireless device of claim 9, wherein the instructions to select the pre-coding matrix comprises instructions to perform at least one of the following steps:
select the pre-coding matrix for an edge point of the block;
select the pre-coding matrix for a corner point of the block; and
select the pre-coding matrix in accordance with points adjacent to the edge point or the corner point in the block.

* * * * *